(12) United States Patent
Takeuchi

(10) Patent No.: US 7,734,128 B2
(45) Date of Patent: Jun. 8, 2010

(54) OPTICAL COMPONENT, FIBER COLLIMATOR ARRAY AND WAVELENGTH SELECTIVE SWITCH

(75) Inventor: Shinichi Takeuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/314,677

(22) Filed: Dec. 15, 2008

(65) Prior Publication Data

US 2009/0257708 A1    Oct. 15, 2009

(30) Foreign Application Priority Data

Apr. 11, 2008    (JP)    ............... 2008-103773

(51) Int. Cl.
G02B 6/26    (2006.01)
G02B 6/42    (2006.01)
(52) U.S. Cl. .................. 385/18; 385/15; 385/16; 385/33; 398/79
(58) Field of Classification Search .................. 385/15, 385/16, 18, 33; 398/79
See application file for complete search history.

(56) References Cited

U.S. PATENT DOCUMENTS 6,771,426 B2 *    8/2004    Yamamoto et al. .......... 359/641
7,330,617 B2 *    2/2008    Aota et al. ..................... 385/18
2002/0071627 A1 *    6/2002    Smith et al. ................... 385/15
2003/0231831 A1 *    12/2003    Yamamoto et al. ............ 385/39
2005/0047711 A1 *    3/2005    Ide et al. ....................... 385/18
2007/0077003 A1 *    4/2007    Aota et al. ..................... 385/18
2007/0153352 A1 *    7/2007    Shibata et al. .............. 359/237

FOREIGN PATENT DOCUMENTS

JP    2007-328177    12/2007

OTHER PUBLICATIONS

D.T. Neilson, et al. "Fully Provisioned 112×112 Micro-Mechanical Optical Crossconnect With 35.8 Tb/s Demonstrated Capacity," Optical Fiber Communicaitons Conference (OFC 2000), Postdeadline paper PD-12, Mar. 2000; (3pp.).

* cited by examiner

Primary Examiner—Frank G Font
Assistant Examiner—Mary A El Shammaa
(74) Attorney, Agent, or Firm—Staas & Halsey LLP

(57) ABSTRACT

The invention provides a fiber collimator array including a fiber array in which a plurality of optical fibers is arrayed and a microlens array in which microlenses are arrayed on positions corresponding to the plurality of optical fibers on a transparent substrate. Each microlens and the transparent substrate are oppositely arranged so that a plurality of projections formed on a bottom face of each microlens intersects with a plurality of projections formed on a surface of the transparent substrate, and each microlens and the transparent substrate are adhered to each other by the adhesive.

5 Claims, 6 Drawing Sheets

FIG.4
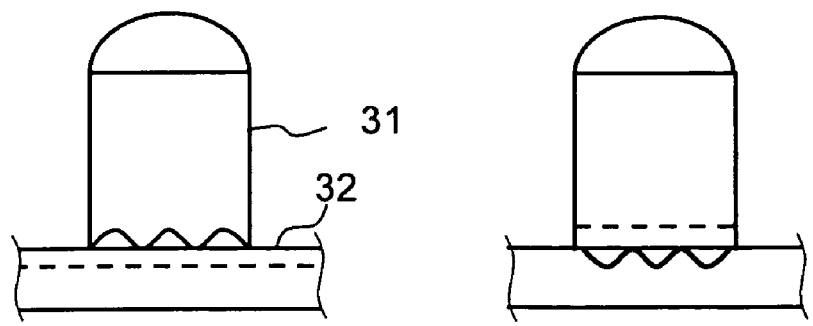
FIG.5
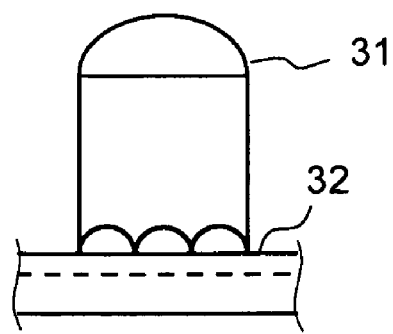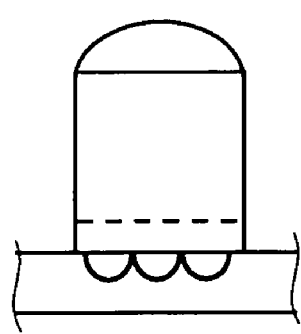
(a)            (b)

FIG.6A
FIG.6B
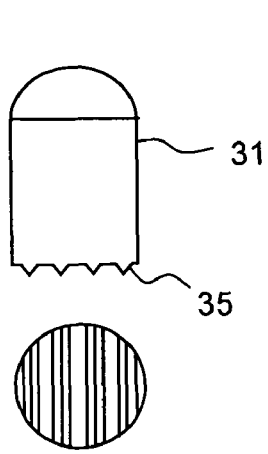
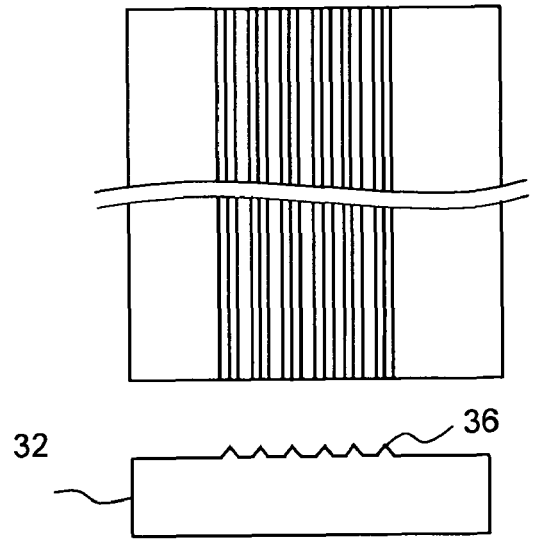
FIG.7
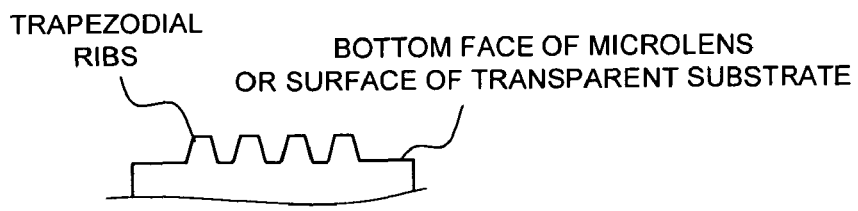
FIG.8
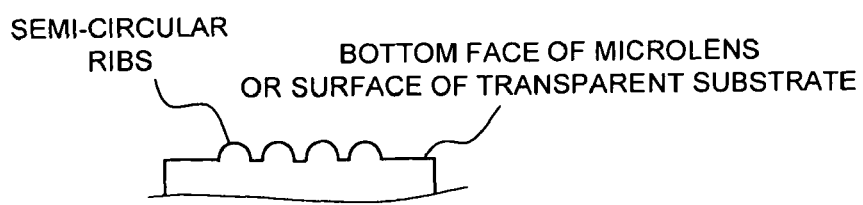

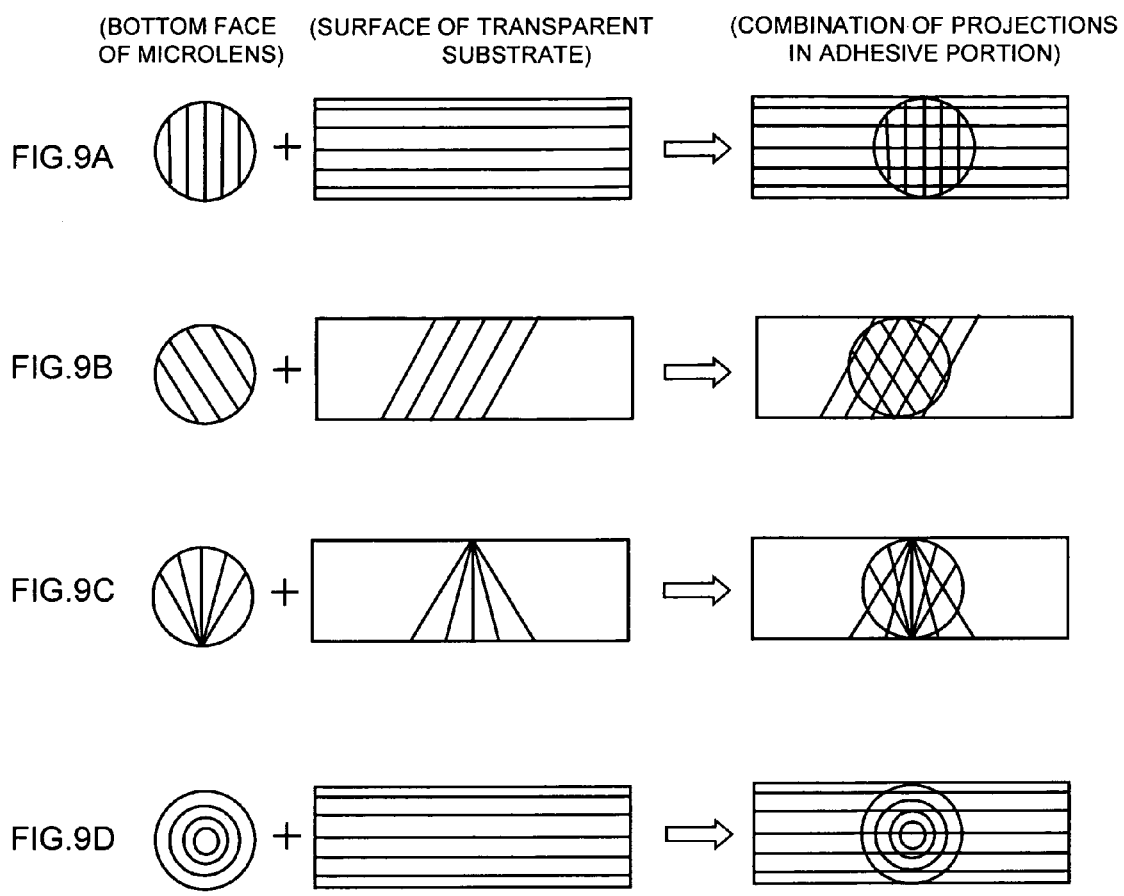
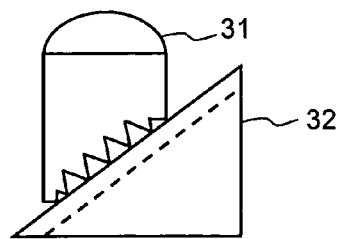
FIG. 10

OPTICAL COMPONENT, FIBER COLLIMATOR ARRAY AND WAVELENGTH SELECTIVE SWITCH

CROSS-REFERENCE TO RELATED APPLICATION

This application is based upon the claims of the benefit of priority of the prior Japanese Patent Application No. 2008-103773, filed on Apr. 11, 2008, the entire contents of which are incorporated herein by reference.

FIELD

The embodiments discussed herein are related to an optical component having an adhesive structure in which a first optical member and a second optical member are adhered to each other, a fiber collimator array and a wavelength selective switch including the fiber collimator having the adhesive structure.

BACKGROUND

In recent years, with the speeding-up of optical signals in a trunk system, it has been needed to process optical signals at ultrahigh-speeds also in an optical switching function, such as, an optical cross-connecting device or the like. Further, the switching scale has also been significantly large due to an increase of wavelength division multiplexing numbers in a wavelength division multiplexing (WDM) transmission technology.

Under such backgrounds, as one of relatively large scale optical switches, the development of a wavelength selective switch (WSS) has been progressed. The wavelength selective switch is an optical device capable of selectively inputting or outputting arbitrary wavelengths, and a fiber collimator array is used as input/output ports thereof. Such a fiber collimator array includes, for example: a fiber array in which a plurality of optical fibers is arrayed to correspond to the input and output ports; and a microlens array in which respective microlenses are arrayed on positions corresponding to the respective optical fibers.

Here, if an optical axis of each optical fiber and an optical axis of each microlens are deviated from each other, an insertion loss of the wavelength selective switch is increased. Therefore, there has been known a configuration in which each microlens is precisely aligned with each optical fiber to thereby configure the fiber collimator array. In a technology disclosed in Japanese Unexamined Patent Publication No. 2007-328177, an optical fiber array block making up the fiber array and a silica microlens mounting base (to be simply referred to as a mounting base, hereunder) making up the microlens array are integrated with each other, and optimum positions on the mounting base are searched, so that respective microlenses are adhered to the optimum positions on the mounting base.

However, since each microlens is significantly small, the adhesive intensity thereof is low by being simply adhered to the mounting base, and therefore, there is a possibility that a resistance to vibration or a resistance to impact cannot be sufficiently ensured. Further, each microlens may be required to be subjected to extremely minute position adjustment, and therefore, it is also necessary to adopt a configuration in which such position adjustment can be easily performed, that is, a configuration in which each microlens is easily moved on the mounting base.

The above described problems are common to optical components each having an adhesive structure in which a relatively small optical member (first optical member) is adhered to another optical member (second optical member).

SUMMARY

The present invention provides a fiber collimator array as one aspect thereof. The fiber collimator array includes: a fiber array in which a plurality of optical fibers is arrayed; and a microlens array in which microlenses are arrayed on a transparent substrate in positions corresponding to the plurality of optical fibers, wherein each microlens and the transparent substrate are oppositely arranged so that a plurality of projections formed on a bottom face (adhesive surface) of each microlens intersects with a plurality of projections formed on a surface (adhesive surface) of the transparent substrate, and each microlens and the transparent substrate are adhered to each other by an adhesive.

The present invention provides a wavelength selective switch as a further aspect thereof. The wavelength selective switch has: (a) a fiber collimator array including: a fiber array in which a plurality of optical fibers containing an optical fiber corresponding to an input port and optical fibers corresponding to output ports is arrayed; and a microlens array in which microlenses are arrayed on a transparent substrate in positions corresponding to the plurality of optical fibers, and the fiber collimator array collimating a wavelength division multiplexed optical signal input to the optical fiber corresponding to the input port by the microlens corresponding to this optical fiber, to output the collimated wavelength division multiplexed optical signal; (b) a spectral element for spectrally separating the wavelength division multiplexed optical signal output from the fiber collimator array according to wavelengths; (c) a condenser element for condensing the optical signals of respective wavelengths spectrally separated by the spectral element on different positions; and (d) a mirror array including a plurality of mirrors arranged on the condensing positions of the optical signals of respective wavelengths, and the mirror array outputting the optical signal reflected by each mirror from any one of the optical fibers corresponding to the output ports via the condenser element, the spectral element and the fiber collimator array. Then, in the fiber collimator array, each microlens and the transparent substrate are oppositely arranged so that a plurality of projections formed on a bottom face of each microlens intersects with a plurality of projections formed on a surface of the transparent substrate, and each microlens and the transparent substrate are adhered to each other by an adhesive.

The present invention provides an optical component as a furthermore aspect thereof. The optical component has an adhesive structure in which a first optical member and a second optical member are adhered to each other, wherein the first optical member and the second optical member are oppositely arranged so that a plurality of projections formed on the first optical member intersects with a plurality of projections formed on the second optical member, and the first optical member and the second optical member are adhered to each other by an adhesive.

The present invention provides a method of manufacturing a fiber collimator array as a still further aspect thereof. The fiber collimator array includes: a fiber array in which a plurality of optical fibers is arrayed; and a microlens array in which microlenses are arrayed on a transparent substrate in positions corresponding to the plurality of optical fibers. Then, the method of manufacturing the fiber collimator array includes: forming a plurality of projections on a bottom face of each microlens and on a surface of the transparent substrate; oppositely arranging the bottom face of each microlens and the surface of the transparent substrate so that the plurality of projections formed on the bottom face of each microlens intersects with the plurality of projections formed on the surface of the transparent substrate; adjusting a position of each microlens on the transparent substrate to arrange each microlens on an optical axis of each optical fiber; and adhering each microlens to the transparent substrate by an adhesive in a state where each microlens is arranged on the optical axis of each optical fiber.

The present invention provides a method of manufacturing an optical component having an adhesive structure in which a first optical member and a second optical member are adhered to each other, as an even still further aspect thereof. The method of manufacturing the optical component includes: forming a plurality of projections on the first optical member and on the second optical member; oppositely arranging the first optical member and the second optical member so that the plurality of projections formed on the first optical member intersects with the plurality of projections formed on the second optical member; adjusting a position of the first optical member on the second optical member; and adhering the first optical member to the second optical member by an adhesive in a state where the position of the first optical member is adjusted on the second optical member.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

FIG. 4 is a diagram illustrating a modified example of the first embodiment;

FIG. 5 is a diagram illustrating a further modified example of the first embodiment;

FIG. 6A and FIG. 6B are diagrams illustrating a second embodiment of the adhesive structure between each microlens and the transparent substrate in the present embodiment;

FIG. 7 is a diagram illustrating a modified example of the second embodiment;

FIG. 8 is a diagram illustrating a further modified example of the second embodiment;

FIG. 9A to FIG. 9D are diagrams typically illustrating arrangements (combinations) of a plurality of projections formed on each microlens and on the transparent substrate, in an adhesive portion;

FIG. 10 is a diagram illustrating the case where adhesive surfaces of the microlens and the transparent substrate are both inclined;

DESCRIPTION OF EMBODIMENTS

Hereinafter, embodiments of the present invention will be described with reference to drawings.

Figure 1:
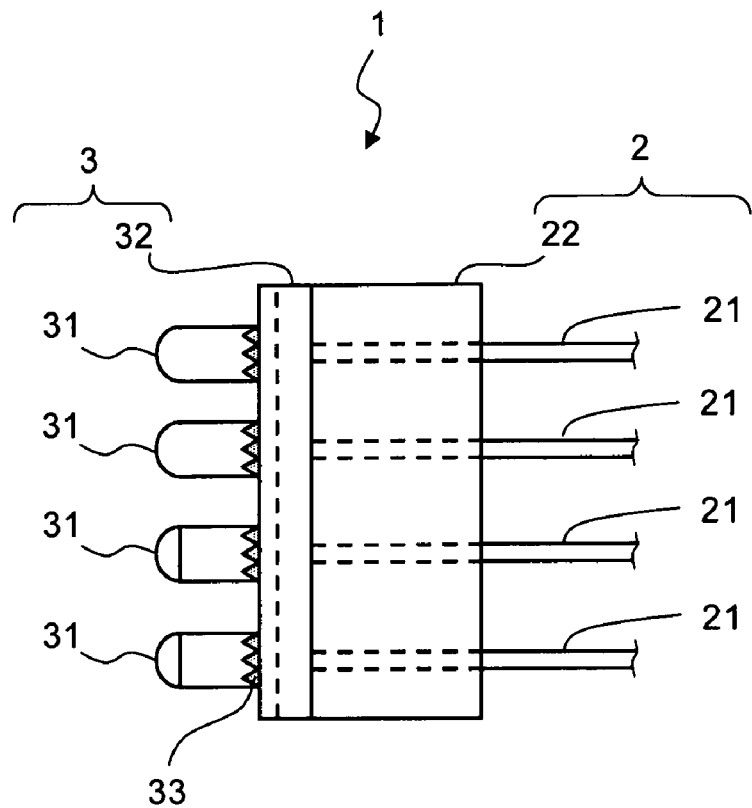
FIG. 1 is a diagram illustrating an overview configuration of a fiber collimator array according to one embodiment of the present invention.

FIG. 1 illustrates an overview configuration of a fiber collimator array according to one embodiment of the present invention. As illustrated in FIG. 1, a fiber collimator array 1 includes: a fiber array 2 in which a plurality of optical fibers 21 (4 optical fibers in the figure) is arrayed; and a microlens array 3 in which a plurality of microlenses 31 is arrayed. The fiber array 2 has a structure in which the plurality of optical fibers 21 is arrayed to be retained by a retainer block 22 at an end portion thereof. The microlens array 3 has a structure in which a bottom face of each microlens 31 is adhered by the adhesive to a position corresponding to each optical fiber 31 on a surface of a glass block (transparent planar substrate, to be referred to as transparent substrate, hereunder) 32 formed of a glass material (silica) for example. A rear face of the transparent substrate 32 (an opposite face of the surface to which each microlens 31 is adhered) is integrated with the retainer block 22 so as to be in tightly contact with end faces of the optical fibers 21. Each microlens 31 is subjected to precise positioning (optical axis adjustment) to each optical fiber 21, and thereafter, is adhered to the transparent substrate 22. Namely, the transparent substrate 22 is fixedly integrated with the retainer block 32, and thereafter, an optimum position for each microlens 31 is searched while moving each microlens 31 on the transparent substrate 32, so that each microlens 31 is adhered to the transparent substrate 32 at the optimum position. Incidentally, the optimum position means a position at which an optical axis of each microlens 31 is coincident with an optical axis of the corresponding optical fiber 21.

Here, for fixing the transparent substrate 32 to the retainer block 22, since the end face of each optical fiber 21 may be in tightly contact with the rear face of the transparent substrate 32, any method may be used. For example, the transparent substrate 32 may be fixed to the retainer block 22 by means of a fixing member (not illustrated in the figure), or an adhesive portion may disposed on a region (not illustrated in the figure) of the retainer block 22 and the transparent substrate 32, to adhere the transparent substrate 32 and the retainer block 22 in the adhesive portion.

Further, for adhering each microlens 31 to the transparent substrate 32, the adhesive having substantially same refractive index as each microlens 31 (for example, the ultraviolet curing adhesive) is used.

Further, in adhering each microlens 31 to the transparent substrate 32, the adhesive may be previously applied on the bottom face (being an adhesive surface) of each microlens 31 or the surface (being an adhesive surface) of the transparent substrate 32, to search the optimum position of each microlens 31 on the transparent substrate 32, or the optimum position of each microlens 31 may be searched on the transparent substrate 31 to supply the adhesive. In either of the cases, each microlens 31 is adhered to the transparent substrate 32 (the adhesive is cured) in a state of being arranged on the optimum position.

In the case where the fiber collimator array 1 is configured as in the above manner, as already described, the adhesive intensity of each microlens 31 and the ease in position adjustment thereof need to be ensured together.

Figure 2A:
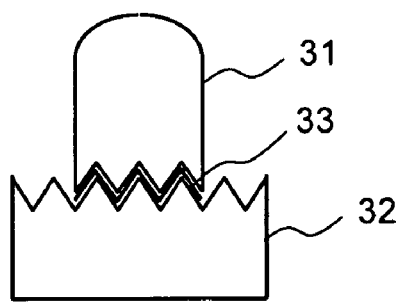
FIG. 2A and FIG. 2B are diagrams exemplarily illustrating methods of improving the adhesive intensity of microlens.
Figure 2B:
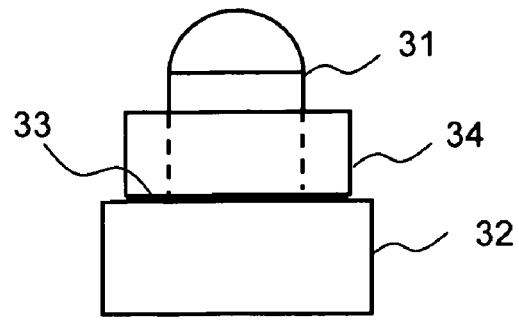

As methods of improving the adhesive intensity, there are considered a method of forming sections of the bottom face of each microlens 31 and of the surface of the transparent substrate 32 in serrated shapes to engage the serrated sections with each other as illustrated in FIG. 2A, a method of additionally disposing a reinforcing member to each microlens 31 to increase an adhesive area to the transparent substrate 32 as illustrated in FIG. 2B, and the like.

However, in the method of engaging the serrated sections with each other (FIG. 2A), although the adhesive area can be increased, it becomes hard to freely move each microlens 31 on the transparent substrate 32 for performing the position adjustment or the like. On the other hand, in the method of additionally disposing the reinforcing member (FIG. 2B), since a contact area (a frictional resistance) to the transparent substrate 32 is increased as well as the adhesive area, it becomes hard to finely adjust the position of each microlens 31 on the transparent substrate 32. Further, in the case where each microlens 31 is to be arrayed at a narrow pitch, the reinforcing member cannot be applied since each reinforcing member interferes with each other.

Therefore, in the present embodiment, a plurality of projections is formed on the bottom face (adhesive surface) of each microlens 31 and on the surface (adhesive surface) of the transparent substrate 32, and the bottom face of each microlens 31 and the surface of the transparent substrate 32 are oppositely arranged so that the projections of each microlens 31 intersect with the projections of the transparent substrate 32, and each microlens and the transparent substrate are adhered to each other by the adhesive.

Here, the height of top portion of the plurality of projections formed on the bottom face of each microlens 31 is all the same, and the height of top portion of the plurality of projections formed on the surface of the transparent substrate 32 is all the same. Further, "projections" contains elongated portions protruding from adjacent regions or adjacent portions, and portions equivalent to respective serrations (teeth) for when the section is formed in a serrated shape or the like, as well as "ribs" formed on a plane or a configuration equivalent thereto correspond to the elongated portions. Further, the elongated portion contains a linear elongated portion, a curved elongated portion and a combination of the linear elongated portion and the curved elongated portion.

Thus, when the plurality of projections formed on the bottom face of each microlens 31 and the plurality of projections formed on the surface of the transparent substrate 32 are arranged to intersect with each other, to thereby be adhered to each other, each microlens 31 and the transparent substrate 32 are in contact with each other directly or via a small amount of the adhesive at the mutual top portions of the projections. Namely, in the adhesive portion, the contact area between each microlens 31 and the transparent substrate 32 is significantly reduced, and at the same time, the adhesive area between each microlens 31 and the transparent substrate 32 is increased. As a result, without the necessity of extending an outer diameter of each microlens 31, the adhesive intensity of each microlens 31 is ensured, and in addition, the position adjustment thereof can be performed easily.

In the present embodiment, the fiber collimator array 1 is specifically manufactured as follows. Namely, the plurality of projections is formed on the bottom face of each microlens 31 and on the surface of the transparent substrate 32, and the bottom face of each microlens 31 and the surface of the transparent substrate 32 are oppositely arranged so that the plurality of projections formed on the bottom face of each microlens 31 intersect with the plurality of projections formed on the surface of the transparent substrate 32. Subsequently, the position adjustment of each microlens 31 is performed on the transparent substrate 32, to thereby arrange each microlens 31 on the optical axis of the corresponding optical fiber 21, and thereafter, each microlens 31 and the transparent substrate 32 are adhered to each other by the adhesive.

Hereunder, there will be described specific examples of adhesive structure between each microlens 31 and the transparent substrate 32.

Figure 3A:
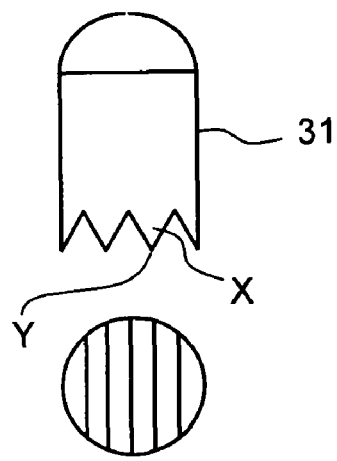
FIG. 3A to FIG. 3C are diagrams illustrating a first embodiment of an adhesive structure between each microlens and a transparent substrate in the present embodiment.
Figure 3B:
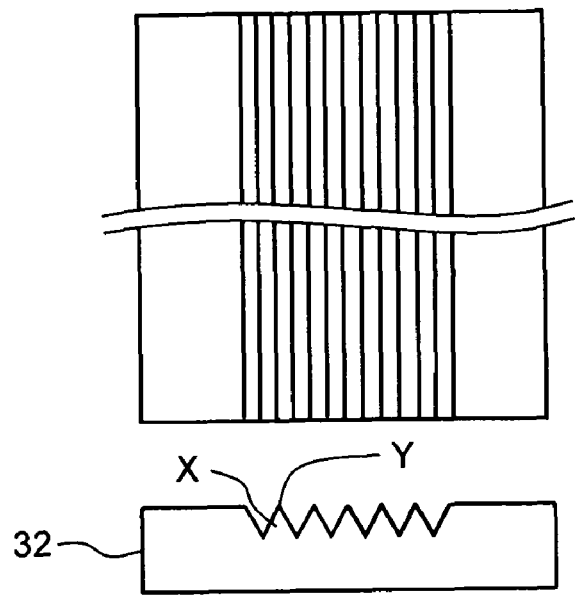
Figure 3C:
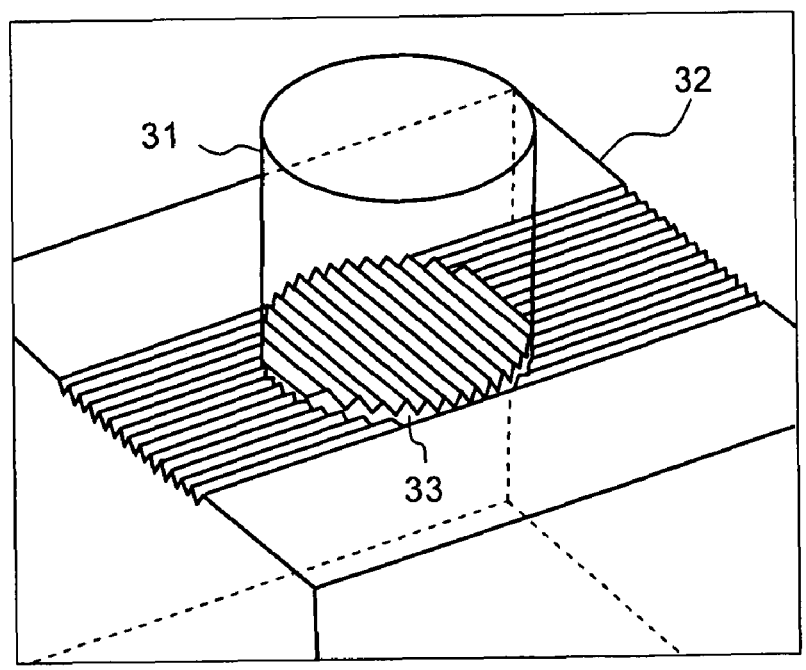

FIG. 3A to FIG. 3C illustrate a first embodiment of the adhesive structure between each microlens 31 and the transparent substrate 32. FIG. 3A illustrates each microlens 31, FIG. 3B illustrates the transparent substrate 32, and FIG. 3C illustrates a state where each microlens 31 is adhered to the transparent substrate 32. In this embodiment, the sections of the bottom face (adhesive surface) of each microlens 31 and of the surface (adhesive surface) of the transparent substrate 32 are formed in the serrated shapes (triangular wave shapes).

The serrated portions on the bottom face of each microlens 31 and on the surface of the transparent substrate 32 can be formed by machining, anisotropic etching or the like. Here, the serrated portion on the microlens 31 side and the serrated portion on the transparent substrate 32 side need not to be formed in all the same shapes. Further, although tip ends of portions equivalent to the respective serrations (teeth) of the serrated portion are sharpened in the figure, these tip ends may be flattened or curved (formed in rounded shapes) by chamfering or the like. In the first embodiment, the portions equivalent to the respective serrations (teeth) of the serrated portion (illustrated by X in the figure) correspond to "projections", and tip end portions of the respective serrations (illustrated by Y in the figure) correspond to "top portions of the projections".

In the first embodiment, as illustrated in FIG. 3A and FIG. 3B, the sections of the bottom face of each microlens 31 and of the surface of the transparent substrate 32 are formed in the serrated shapes, to be oppositely arranged so that the serrated portion formed on the bottom face of each microlens 31 are not engaged with the serrated portion formed on the surface of the transparent substrate 32, that is, so that the serrated portion of each microlens 31 intersect with the serrated portion of the transparent substrate 32. Preferably, as illustrated in FIG. 3C, the bottom face of each microlens 31 and the surface of the transparent substrate 32 are oppositely arranged so that the serrated portions thereof are approximately orthogonal to each other.

Then, the position adjustment of each microlens 31 is performed on the transparent substrate 32, and thereafter, each microlens 31 is adhered to the transparent substrate 32 by the adhesive. At this time, as already described, before performing the position adjustment, the adhesive may be previously applied on the bottom face of each microlens 31 and/or on the surface of the transparent substrate 32, to be cured at a time point when the position adjustment is finished, or after performing the position adjustment, the adhesive may be supplied between each microlens 31 and the transparent substrate 32 to be cured.

As a result, the bottom face of each microlens 31 and the surface of the transparent substrate 32 are in intermittently contact with each other directly or via the small amount of the adhesive at the tip end portions (Y) of the serrations (teeth) of the respective serrated portions thereof, that is, at the top portions of the projections (X). Here, especially in the case where the tip ends of the respective serrations (teeth) are sharpened or curved (rounded shapes), each microlens 31 and the transparent substrate 32 are in point contact with each other at a plurality of points, whereas in the case where the tip ends of the respective serrations (teeth) are flattened, each microlens 31 and the transparent substrate 32 are in face-to-face contact with each other by relatively small areas at a plurality of sites. In either cases, the contact area between each microlens 31 and the transparent substrate 32 is significantly reduced, and at the same time, the adhesive area between each microlens 31 and the transparent substrate 32 is increased, compared with the case where the bottom face of each microlens 31 and the surface of the transparent substrate 32 are formed in the same plane. As a result, the adhesive intensity of each microlens 31 can be ensured while easily performing the position adjustment (for example, optical axis adjustment) thereof on the transparent substrate 32.

FIG. 4 and FIG. 5 illustrate modified examples of the first embodiment. Briefly describing, in FIG. 4, the sections of the bottom face of each microlens 31 and of the surface of the transparent substrate 32 are formed in sinusoidal wave shapes, and in FIG. 5, the sections thereof are formed in continuous semicircular (circular arc) shapes. These shapes can be formed by machining, anisotropy etching or the like. Then, similarly to the first embodiment, each microlens 31 and the transparent substrate 32 are oppositely arranged so that the projections of each microlens 31 and the projections of the transparent substrate 32 intersect with each other (preferably, are approximately orthogonal to each other), to thereby be adhered to each other by the adhesive. Also in these cases, the section on the microlens 31 side and the section on the transparent substrate 32 need not to be formed in all the same shapes.

FIG. 6 illustrates a second embodiment of the adhesive structure between each microlens 31 and the transparent substrate 32. FIG. 6A illustrates each microlens 31 and FIG. 6B illustrates the transparent substrate 32. In the second embodiment, a plurality of ribs each having a triangular cross section is formed at a constant pitch on the bottom face (adhesive surface) of each microlens 31 and on the surface (adhesive surface) of the transparent substrate 32. These ribs can also be formed by machining, anisotropic etching or the like. Further, top portions of the ribs may be formed in curved faces (rounded faces) by chamfering or the like, and the ribs of each microlens 31 and the ribs of the transparent substrate 32 need not to be formed in all the same shapes.

Then, each microlens 31 and the transparent substrate 32 are oppositely arranged so that ribs 35 formed on the bottom face of each microlens 31 and ribs 36 formed on the surface of the transparent substrate 32 intersect with each other (preferably, are approximately orthogonal to each other), to be adhered to each other by the adhesive. Thus, each microlens 31 and the transparent substrate are in point contact with each other at top portions of the ribs 35 and of the ribs 36, so that the contact area between each microlens 31 and the transparent substrate 32 is significantly reduced, and at the same time, the adhesive area between each microlens 31 and the transparent substrate 32 is increased. As a result, similarly to the first embodiment, the adhesive intensity of each microlens 31 can be ensured, and at the same time, the position adjustment thereof can be easily ensured.

Incidentally, as a modified example of the second embodiment, in place of the ribs 35 and the ribs 36 each having the triangular cross section, there may used ribs each having a trapezoidal cross section as illustrated in FIG. 7 or ribs each having a semi-circular cross section as illustrated in FIG. 8. In the case such ribs are used, effects similar to those in the second embodiment can be obtained.

Each microlens 31 and the transparent substrate 32 may be oppositely arranged so that the projections formed on the bottom face of each microlens 31 and the projections formed on the surface of the transparent substrate 32 intersect with each other, to be adhered to each other, and accordingly, the adhesive structure between each microlens 31 and the transparent substrate 32 is not limited to the first embodiment, the second embodiment or the modified examples of the embodiments. Namely, there may be made various arrangements (combinations) of the plurality of projections formed on the bottom face of each microlens 31 and the plurality of projections formed on the surface of the transparent substrate 32 in the adhesive portion. Some of the various arrangements (combinations) will be exemplarily shown in the followings.

FIG. 9A to FIG. 9D typically illustrate the arrangements (combinations) of the plurality of projections formed on the bottom face of each microlens 31 and the plurality of projections formed on the surface of the transparent substrate 32 in the adhesive portion between each microlens 31 and the transparent substrate 32. In FIG. 9, lines or circles appearing on the bottom face of each microlens and on the surface of the transparent substrate indicate the top portions of the respective projections (tip ends of the ribs or serrated edge portions of the serrated sections), and FIG. 9A corresponds to the first embodiment (FIG. 3).

FIG. 9B illustrates a combination example for when the plurality of obliquely and linearly extending projections is formed at a constant pitch on the surface of the transparent substrate 32.

FIG. 9C illustrates a combination example for when the plurality of projections extending in radial from a predetermined position (starting point) of a circumferential portion is formed on the bottom face of each microlens 31 and on the surface of the transparent substrate 32. In this case, even after the position of each microlens 31 is adjusted, by supplying the adhesive from the starting point on the microlens 31 side or/and from the starting point on the transparent substrate 32 side, the adhesive can be efficiently spread between the bottom face of each microlens 31 and the surface of the transparent substrate 32.

FIG. 9D illustrates a combination example for when the plurality of projections in concentric circles is formed on the bottom face of each microlens 31 whereas the plurality of linear projections is formed at a constant pitch on the surface of the transparent substrate 32. In this case, the adhesive retention capacity on the bottom face of each microlens 31 can be improved.

By using the above described adhesive structure between each microlens 31 and the transparent substrate 32, it is possible to easily perform the position adjustment of each microlens 31 on the transparent substrate 32, and also, it is possible to ensure the adhesive intensity thereof without the necessity of extending the outer diameter of each microlens 31 to thereby improve a resistance to vibration of the fiber collimator array and a resistance to impact thereof. Incidentally, as illustrated in FIG. 10, even in the case where the adhesive surfaces of each microlens 31 and of the transparent substrate 32 are inclined, the present invention can surely be applied.

According to such a fiber collimator array and such a method of manufacturing the fiber collimator array, it is possible to easily perform the position adjustment (for example, the optical axis adjustment to the optical fiber) of each microlens, and also, it is possible to ensure the adhesive intensity thereof without the necessity of extending the outer diameter of each microlens to thereby improve the resistance to vibration and the resistance to impact.

Next, there will be described the application of the fiber collimator array having the above described adhesive structure between each microlens and the transparent substrate to a wavelength selective switch (WSS).

Figure 11:
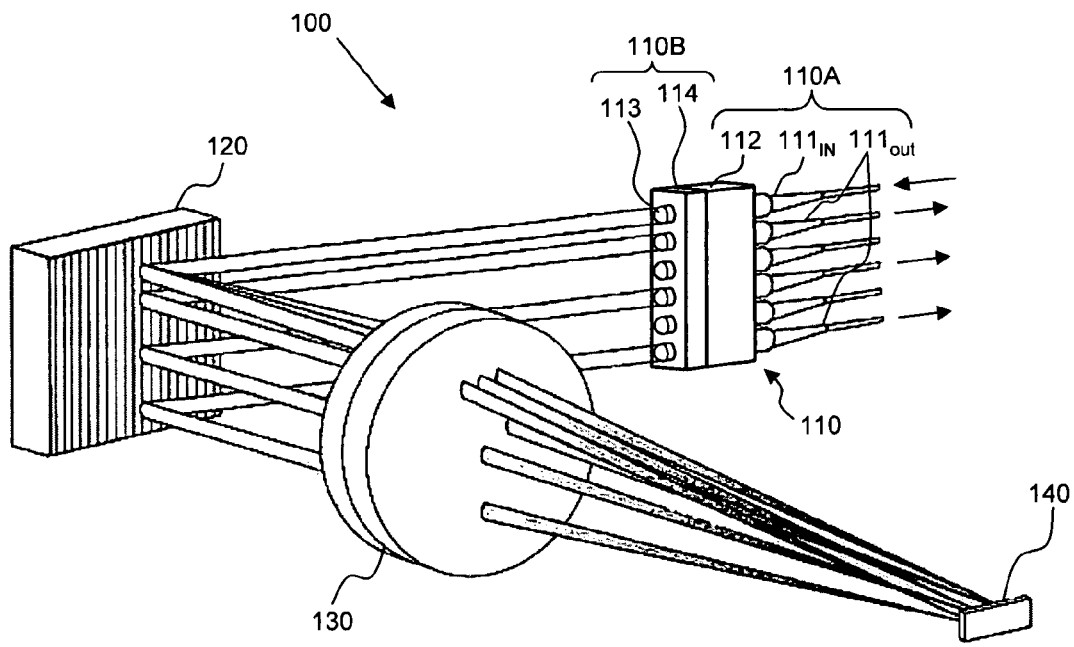
FIG. 11 is a diagram illustrating a configuration of a wavelength selective switch to which the fiber collimator array according to the present embodiment is applied.

FIG. 11 illustrates one example of wavelength selective switch. As illustrated in FIG. 11, a wavelength selective switch 100 has: a fiber collimator array 110; a spectral element 120; a condenser element 130; and a mirror array 140. The fiber collimator array 110 includes a fiber array 110A in which a plurality of optical fibers is arrayed and a microlens array 110B in which a plurality of microlenses is arrayed. The fiber array 110A has a structure in which an optical fiber (a single optical fiber in the figure) $111_{IN}$ corresponding to an input port and optical fibers $111_{OUT}$(#1) to $111_{OUT}$(#N) (five optical fibers in the figure) corresponding to output ports are arrayed in one direction, to be retained by a retainer block 112 at end portions thereof. The microlens array 110B has a structure in which respective microlenses 113 are adhered to positions corresponding to the respective optical fibers 111 on a transparent substrate 114. In the fiber collimator array 110, a wavelength division multiplexed optical signal input from the input port (the optical fiber $111_{IN}$) travels through the transparent substrate 114 while being spread, and is collimated by the corresponding microlens 113 to be converted into a parallel light to thereby be output.

The spectral element 120 is a diffraction grating for example, and (spectrally) separates the wavelength division multiplexed optical signal output from the fiber collimator array 110 to different angle directions for respective wavelengths.

The condenser element 130 is a condenser lens for example, and condenses optical signals of respective wavelengths (respective wavelength channels) (spectrally) separated by the spectral element 120 on different positions.

The mirror array 140 includes a plurality of mirrors (#1 to #N) disposed on condensing positions of the optical signals of respective wavelengths. Each mirror is a MEMS mirror manufactured using a MEMS (Micro Electro Mechanical Systems) technology. The respective optical signals (respective wavelength channels) reached the mirror array 140 are reflected by the corresponding MEMS mirrors to be turned to predetermined directions. Here, each MEMS mirror is supported by a pair of torsion bars for example, to be swung around the torsion bars, and is controlled by a control section (not shown in the figure) at an angle (swinging position) corresponding to a position of the output port set as the output determination of each optical signal. Thus, the optical signal (wavelength channel) reflected by each MEMS mirror of the mirror array 140 passes through the condenser element 130, the spectral element 120 and the fiber collimator array 110 in this order, to be output from the desired output port.

Figure 12:
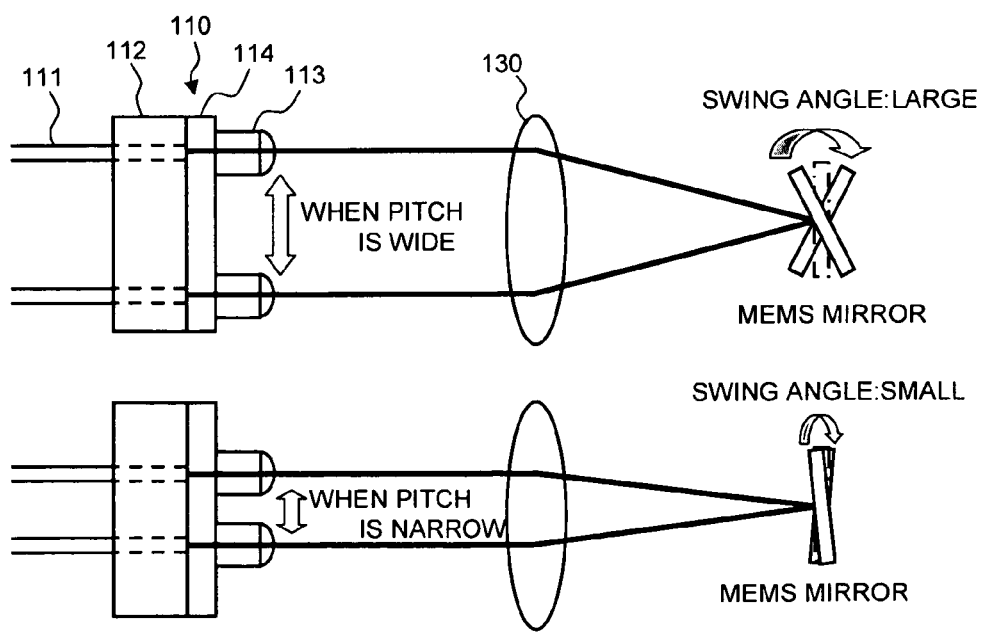
FIG. 12 is a diagram for explaining a relation between an array pitch of microlenses and a swing angle of a MEMS mirror in the wavelength selective switch.

In the wavelength selective switch of such a configuration, the fiber collimator array 110 is required to ensure the adhesive intensity of each microlens 113 to the transparent substrate 114, and to ensure the ease in position adjustment of each microlens 113 on the transparent substrate 114. Further, as illustrated in FIG. 12, the array pitch of each microlens 113 and a swing angle of each MEMS mirror are in an approximately proportional relation. Therefore, due to the restriction of the swing angle of each MEMS mirror or the like, the array pitch of each microlens 113 cannot be so extended, and therefore, it is hard to ensure the adhesive intensity by a reinforcing member (refer to FIG. 2B).

In this point, each adhesive structure between each microlens and the transparent substrate as described in FIG. 1 to FIG. 9 ensures the adhesive intensity of each microlens to the transparent substrate without the necessity of extending the outer diameter of each microlens, and in addition, ensures the ease in position adjustment of each microlens on the transparent substrate, and accordingly, is suitable for the wavelength selective switch described above.

Therefore, in the fiber collimator array 110 of the wavelength selective switch 100 according to the present embodiment, each adhesive structure between each microlens and the transparent substrate as described in FIG. 1 to FIG. 9 is adopted.

According to the wavelength selective switch 100 in the present embodiment, it is possible to easily perform the optical axis adjustment between each optical fiber 112 and each microlens 113, and also, to ensure the adhesive intensity of each microlens 113. Thus, an increase in insertion loss of the wavelength selective switch 100 is suppressed, and the resistance to vibration and the resistance to impact are improved in the entire wavelength selective switch 100.

In the above descriptions, there has been described the fiber collimator array and the wavelength selective switch comprising the fiber collimator array. However, as already described, the present invention can be applied to an optical component configured such that a relatively small member (element) is adhered to another member (element) while being subjected to the position adjustment. In such a case, it may be considered that each microlens is a first optical member, the transparent substrate is a second optical member, and the fiber collimator array or the microlens array is an optical component having an adhesive structure in which the first optical member and the second optical member are adhered to each other.

According to such an optical component, it is possible to easily perform the position adjustment of the first optical member on the second optical member, and also, to improve the adhesive intensity between the first optical member and the second optical member.

All examples and conditional language recited herein are intended for pedagogical purposes to aid the reader in understanding the principles of the invention and the concepts contributed by the inventor for furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wavelength selective switch comprising:
   a fiber collimator array including a fiber array in which a plurality of optical fibers containing an optical fiber corresponding to an input port and optical fibers corresponding to output ports is arrayed and a microlens array in which microlenses are arrayed on a transparent substrate in positions corresponding to the plurality of optical fibers, and the fiber collimator array collimating a wavelength division multiplexed optical signal input to the optical fiber corresponding to the input port by the microlens corresponding to this optical fiber, to output the collimated wavelength division multiplexed optical signal;
   a spectral element for spectrally separating the wavelength division multiplexed optical signal output from the fiber collimator array according to wavelengths;
   a condenser element for condensing optical signals of respective wavelengths spectrally separated by the spectral element on different positions; and a mirror array including a plurality of mirrors disposed on the condensing positions of the optical signals of respective wavelengths, and the mirror array outputting the optical signal reflected by each mirror from any one of the optical fibers corresponding to the output ports via the condenser element, the spectral element and the fiber collimator array, wherein, in the fiber collimator array, each microlens and the transparent substrate are oppositely arranged so that a plurality of projections formed on a bottom face of each microlens intersects with a plurality of projections formed on a surface of the transparent substrate, and each microlens and the transparent substrate are adhered to each other by an adhesive.

2. A wavelength selective switch according to claim 1, wherein, in an adhesive portion, each microlens and the transparent substrate are in intermittently contact with each other directly or via the adhesive at top portions of the plurality of projections formed on the bottom face of each microlens and top portions of the plurality of projections formed on the surface of the transparent substrate.

3. A wavelength selective switch according to claim 2, wherein the top portions of the plurality of projections formed on the bottom face of each microlens and the top portions of the plurality of projections formed on the surface of the transparent substrate are in point contact with each other.

4. A wavelength selective switch according to claim 1, wherein the bottom face of each microlens and the surface of the transparent substrate each has a serrated portion of which section is formed in a serrated shape, and each microlens and the transparent substrate are oppositely arranged so that the serrated portion of the bottom face of each microlens and the serrated portion of the surface of the transparent substrate are not engaged with each other, and each microlens and the transparent substrate are adhered to each other by the adhesive.

5. A wavelength selective switch according to claim 1, wherein each microlens is subjected to position adjustment on the transparent substrate to be arranged on an optical axis of the optical fiber, to thereby be adhered to the optical axis position.

* * * * *